United States Patent
Cooper

[11] 3,913,615
[45] Oct. 21, 1975

[54] FLAT-LAPPED VALVE CARTRIDGE ASSEMBLY WITH CAGED POPPET

[75] Inventor: Roydon B. Cooper, Locust Valley, N.Y.

[73] Assignee: Pall Corporation, Glen Cove, N.Y.

[22] Filed: Oct. 18, 1973

[21] Appl. No.: 407,758

[52] U.S. Cl. .................................. 137/543.19
[51] Int. Cl.[2] ................................ F16K 15/02
[58] Field of Search . 137/540, 543, 543.17, 543.19, 137/454.2, 454.4, 454.5, 454.6

[56] References Cited
UNITED STATES PATENTS

| 1,717,856 | 6/1929 | Smith | 137/543.17 |
|---|---|---|---|
| 2,904,065 | 9/1959 | Butlin | 137/543.19 X |
| 3,657,893 | 4/1972 | Tadokoro | 137/540 X |
| 3,788,071 | 1/1974 | Brewer | 137/543.17 X |

FOREIGN PATENTS OR APPLICATIONS

| 709,961 | 7/1941 | Germany | 137/543.17 |
|---|---|---|---|
| 673,045 | 2/1939 | Germany | 137/543.17 |
| 359,340 | 3/1938 | Italy | 137/543.17 |

*Primary Examiner*—William R. Cline

[57] ABSTRACT

A flat-lapped valve is provided comprising a tubular support defining a relief valve passage therethrough and having at one end a valve seat and at the other end an outwardly-projecting flange engaging and retaining a poppet cage; a valve poppet movable within the cage toward and away from the valve seat to open and close the valve passage; and bias means within the cage biasing the poppet toward the valve seat, and retaining the poppet in a normally closed position at fluid pressures up to a predetermined minimum.

3 Claims, 4 Drawing Figures

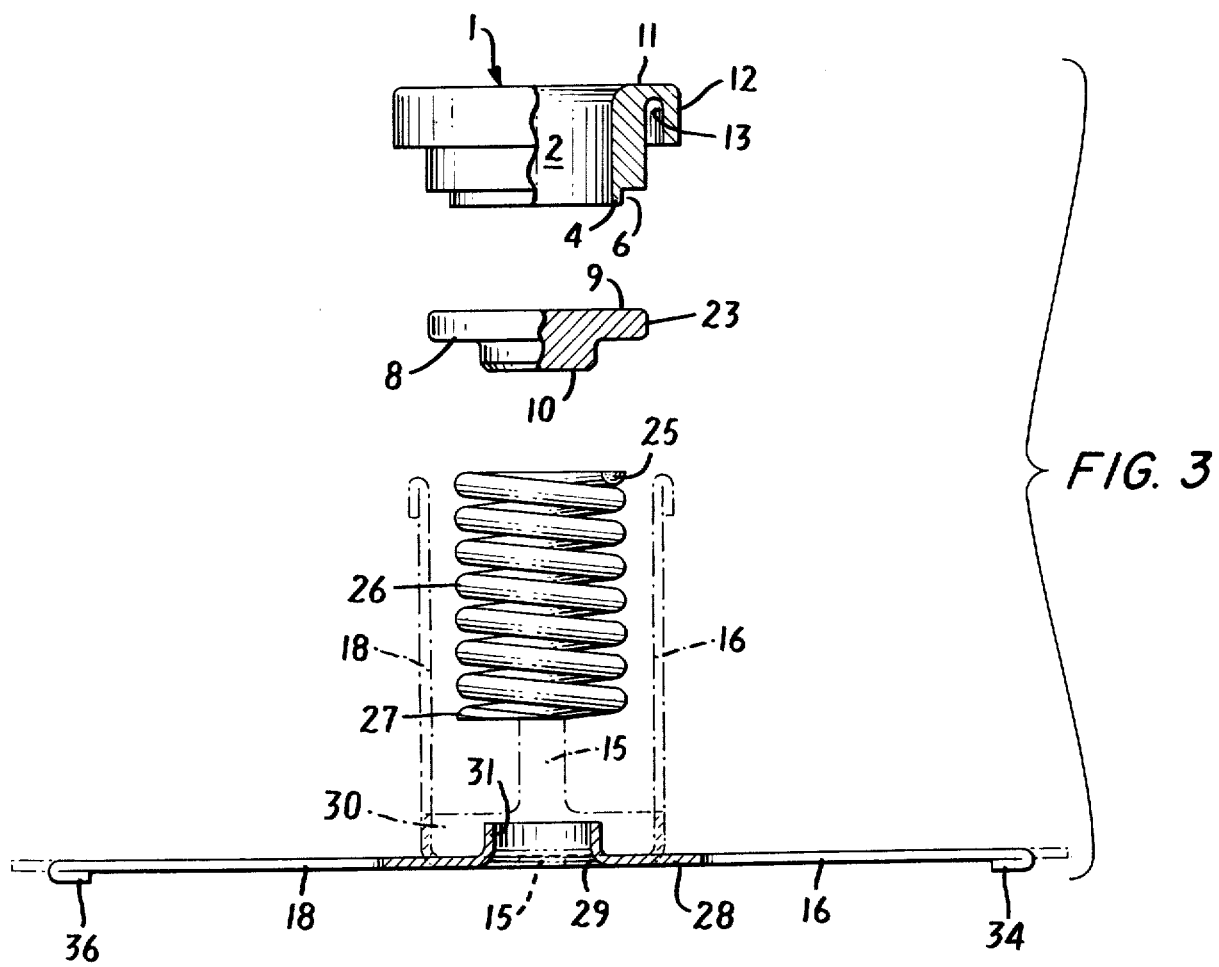
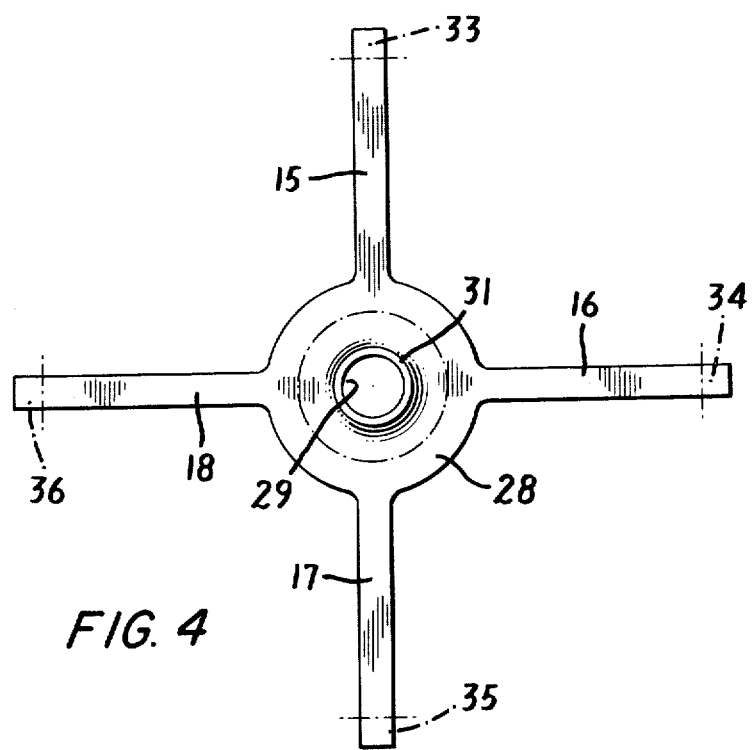

FLAT-LAPPED VALVE CARTRIDGE ASSEMBLY WITH CAGED POPPET

Relief valves are commonly in use in fluid lines to relieve pressures within the line in excess of a predetermined minimum. Under normal fluid pressures in the system, the relief valve is closed, and remains so. When, however, fluid pressure within the system increases to above a predetermined minimum, the excessive abnormal pressure is sensed by the relief valve, which responds thereto by opening and thus relieving the fluid pressure, either by venting the fluid or by permitting the fluid to move through a bypass line. If, for example, the excessive fluid pressure in the system arises from a clogged filter, the relief valve can control the flow through a bypass line which avoids the filter, and thus maintain an unfiltered normal or reduced fluid flow in the system. Such fluid flow although of unfiltered fluid may nonetheless be preferable to a complete cessation of flow. Thus, for example, in aircraft filters are commonly interposed in the hydraulic system controlling the operation of the landing gear. Should the fluid flow be impeded because of filter blockage, however, it is nonetheless essential to provide for a continued fluid flow, to operate the landing gear system, particularly when blockage occurs while the craft is airborne, to make possible a safe landing, after which the filter can be replaced and the clogged condition remedied.

A prerequisite for a relief valve is that it be reliable and dependable in operation. It is also usually important that the relief valve have as small a volume as possible, so as to occupy a minimum of space. It is likewise important that the relief valve be light in weight, for systems such as airborne systems and space applications, including guided missiles, where weight can be at a premium.

These requirements are not easily met, particularly by relief valves of the poppet type, in which a poppet is spring-biased against a valve seat to close off a relief valve passage. Such a valve requires a fixed valve seat, and a way of retaining the poppet against the valve seat by some kind of bias means. Since the bias means must retain the poppet against the seat by application of a considerable force, to resist high fluid pressure differentials in some systems, a complicated housing structure to anchor the spring is frequently required, because a spring when retaining the poppet in position against high fluid pressure differentials naturally exerts an equal and opposite force against the means holding the spring in position.

One way of overcoming the difficulty is to seat the spring in a drilled-out bore in the housing, but this requires expensive machining, and must usually be a hand operation. Another alternative is to encase the valve seat, poppet, and bias means within a separate housing, but this increases the size of the relief valve assembly package, and also makes the assembly more expensive.

In accordance with the invention, a relief valve assembly of quite simple and inexpensive construction is provided, that is readily assembled with a minimum of hand labor from a very few modular component parts. In fact, as few as four structural components are required. The structure, moreover, is compact, and can be fitted within a quite small space. The assembly can be manufactured either of metal or of plastic or of mixtures of metal and plastic parts, with the result that the various structural components can be prefabricated and stamped cast, molded, or extruded, thus further reducing manufacturing costs.

The valve does not require any seals, and there is an absolute minimum of friction in movement of the poppet, since the poppet engages the surfaces retaining it in a point to line contact. The valve moreover has an excellent flow capability since full flow is obtained at pressures not exceeding 125% of the crack open pressure. The valve assembly is easy to install, since it can be put into a mating cavity, and then swaged or staked in place, and the cage can be retained by swaging or spinning.

The relief valve assembly in accordance with the invention comprises, in combination, a tubular support defining a relief valve passage therethrough and having at one end a valve seat and at the other end an outwardly-projecting flange engaging and retaining a poppet cage; a valve poppet movable within the cage toward and away from the valve seat to open and close the valve passage; and bias means within the cage biasing the poppet toward the valve seat and retaining the poppet in a closed position at fluid pressures up to a predetermined minimum, the valve poppet at fluid pressures in excess of said minimum overcoming the biasing force of the bias means and moving away from the valve seat to open the relief valve passage.

A preferred embodiment of relief valve assembly in accordance with the invention is shown in the drawings, in which:

FIG. 3 represents an exploded view showing the individual structural components of the relief valve assembly in position for assembly to form the finished valve; and FIG. 4 represents a top view of a preformed blank used to form the cage of FIGS. 1 to 3.

Figure 1:
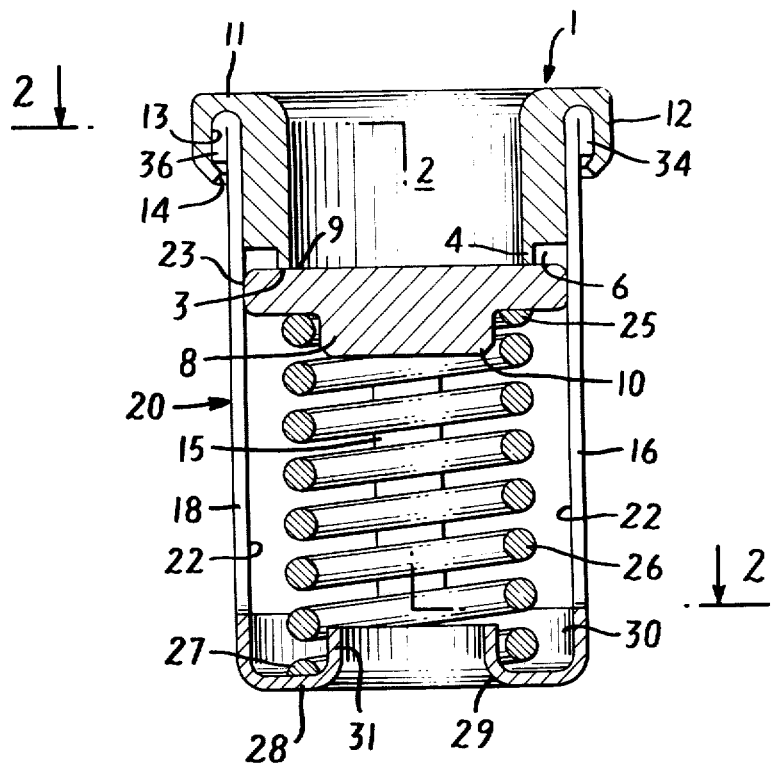
FIG. 1 represents a longitudinal section through a relief valve assembly in accordance with the invention.

The relief valve assembly shown in the drawings comprises a tubular support 1 having therethrough a relief valve passage 2. One face 3 of the tube constitutes a valve seat, and for this purpose is lapped to lightband flatness to ensure a leak-tight seating of the poppet 8 thereagainst.

At the other end of the tube 1 is an outwardly-projecting flange 11, terminating in a turned portion 12. This tube can be formed from tube stock, but is preferably drilled out from a solid block of metal or plastic, so that the flange portions 11, 12 are rigid, and integral with the tubular body portion, and define an annular recess or socket 13 therebetween of fixed dimensions.

Thrust tightly into the recess 13 in a press fit, secured against withdrawal by the reentrant tip 14 of flange 12, are the four struts 15, 16, 17, 18 of the cage 20, which retains the poppet 8 therewithin. The inner faces 22 of the cage struts in fact serve as a track along which the external periphery 23 of the poppet 8 moves, as the poppet moves toward and away from the valve seat 4. The poppet fits loosely within the cage struts, and does not contact more than two struts at a time, with a point-to-line contact, for an absolute minimum friction.

The poppet is formed with a flat-lapped sealing face 9. The opposite face has a centrally-raised portion 10 serving as a centering guide for the poppet end 25 of the compression spring 26. The struts of the cage 20 extend from the periphery of the annular U-channel 28 which as a central aperture 29, with the two channel flanges 30, 31 projecting inwardly toward the interior of the cage, and the other end 27 of the spring 26 seats against the base of the channel 28 between the flanges 30, 31, of which flange 31 serves as spring centering guide. Consequently, the poppet case 20 holds that end of the compression spring 26 in a fixed position, so that the spring biases the poppet 8 against the valve seat 4.

The compressive force of the spring is so selected that the spring retains the poppet against the seat at all fluid pressures within the system up to a predetermined minimum, in the direction from the valve passage 2 across the poppet 8 to the interior of the cage 20. Such fluid pressures are the fluid pressures normally expected to be encountered within the system.

At fluid pressures in excess of a predetermined minimum, however, the biasing force of the spring 26 is insufficient to retain the poppet 8 against the valve seat 4, and when such fluid pressure differentials across the poppet 8 from the relief valve passage 2 are reached, the poppet is forced away from the valve seat, opening the relief valve passage 2. Fluid is then free to flow from the passage between the poppet and the valve seat, into the interior of the poppet cage, and past the struts of the poppet cage.

Accordingly, in operation, the poppet is normally held in the position shown in FIG. 1. When, however, fluid pressures across the valve poppet 8 exceed the predetermined minimum, the poppet is moved away from the valve seat, opening an annular passage between its face 9 and the valve seat 4, and the fluid then passes through the poppet cage 20 to and through the fluid line connection 30.

The relief valve assembly as shown can be arranged in any fluid system where a relief fluid flow is required. The relief valve assembly can, for example, be used to control a bypass line, which makes it possible to maintain fluid flow in a system when a filter element is clogged, by bypassing the filter. The valve can also be arranged to vent fluid to the atmosphere, it being ideally suited for this purpose because of the open cage construction downstream of the poppet.

Figure 2:
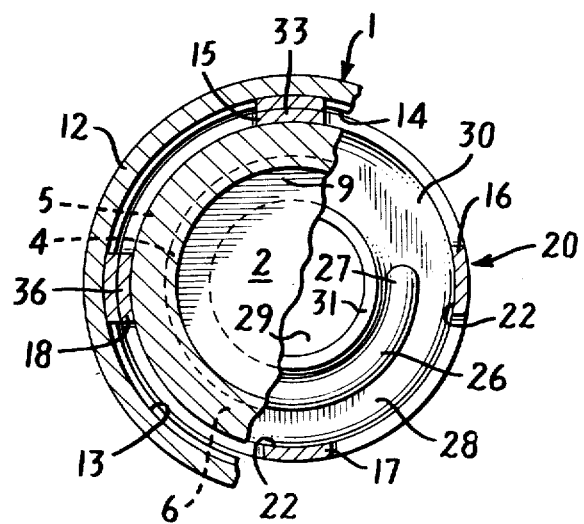
FIG. 2 represents a cross-sectional view, taken along the lines 2—2 of the relief valve assembly of FIG. 1, and looking in the direction shown by the arrows.

A particular feature of the structure shown in FIGS. 1 to 3 is the turned end of the struts of the poppet cage. By swaging or spinning each of these struts in the manner shown, a positive nonslip grip between the flange and the body portion of the tube is ensured.

If the tubular member 1 of the embodiment shown in the drawings has the relief passage 2 as a central bore drilled out of a solid piece, the flange 11, 12 appears as shown in FIG. 3.

The cage 20 is made of one piece of sheet material, of which a flat pre-shaped blank is shown in FIG. 4, with a central aperture 29, an annular U-channel 28 with an outer flange 30, an inner flange 31 (formed by cutting out part of the aperture and turning in the periphery, enlarging the aperture and forming the flange), and four struts 15, 16, 17, 18 extending outwardly. The tips 33, 34, 35, 36 of the struts 15, 16, 17, 18 of the poppet cage 20 are swaged, crimped or spun into the socket 13 so that their ends are turned in a V, as shown in FIG. 3.

In assembling this device, the poppet 8 and spring 26 with its end over centering guide 10 are placed in position against the valve seat 4. The body of the tubular support 1 is then inserted within the pre-formed poppet cage 20, and the ends of struts 33, 34, 35, 36 swaged or spun into the socket 13, so that the tips 14 of flange 12 is brought into the position shown in FIGS. 1 and 2. The reentrant tip 14 thus retains the strut ends in the socket 13. The result is positive nonslip grip between the tubular support 1 and the poppet cage 20, so that the poppet cage is firmly retained to the tubular support, thus holding the poppet 8 and spring 26 securely within the cage, and ensuring a leak-tight seal between the poppet and the valve seat, strong enough to resist the normal fluid pressures expected to be encountered in the system, against the poppet from the relief valve passage.

As indicated, the components of the relief valve assembly can be made of metal or plastic, or mixtures of both. It is normally preferred that the various valve components be made of stainless steel, because of the high strength and corrosion resistance of this material. It is also possible, however, to form the relief valve assembly of other high tensile strength metals, such as iron, carbon steel, titanium alloys, beryllium alloys, nickel, tantalum, and manganese. Plastic materials may also be used, provided they are shape-retaining and will hold a set, such as thermosetting resins in a fully polymerized set condition, including phenol-formaldehyde, urea-formaldehyde and melamine-formaldehyde resins, polystyrene, polycarbonates and polyesters. It is also possible to form one of the tubular supports and the poppet of plastic, and the other of metal, to ensure leak-tight seating under special conditions. For such a purpose, the poppet can also be formed, in addition to the plastics named above, of polytetrafluoroethylene, polyamides, polypropylene, polyethylene and polytrifluoromonochloroethylene, as well as Viton A.

While the embodiment shown in the drawings is constructed with a spring as the bias means, other types of bias means can be used. The tubular support can, for example, be made of magnetic material, or it can be a magnet, and the poppet can be of magnetic material or a magnet, so as to be held against the valve seat by magnetic force. Very high retaining forces can be obtained if both the tube and the poppet are magnets. A magnet can then be placed at the other end of the cage, in the location of the ring, so that when the poppet is thrust away from the valve seat by magnetic force, it is moved to within the range of this magnet, and retained there. Such a valve can then be closed when the pressure condition has been alleviated by simply pushing the poppet back against the valve seat, entering a pin through the aperture 29. This kind of relief valve assembly thus does not automatically return to the normal position, but requires correction of the condition, and manual replacement of the poppet, which can be valuable in some circumstances.

While the cage assembly is illustrated with four struts it is of course apparent that a greater or lesser number of struts can be used. The poppet can be well retained within the cage by as few as three struts, or by as many as ten struts, and more. The simplest and least expensive construction, however, utilizes from three to five struts.

The exact construction of the poppet cage of course is determined by the type of bias means employed. A coil spring requiring seating at each end is best seated against a flanged ring at one end of the cage. When magnets are used, no annular opening is needed, and a solid cage end can be used instead, or the four struts can be formed of two lengths of material each turned in a U-shape, crossed, and bonded together at their crossing point at the apex of the cage.

Having regard to the foregoing foreclosure, the following is claimed as the inventive and patentable embodiments thereby:

1. A relief valve assembly made entirely of metal and comprising, in combination, a metallic tubular support defining a relief valve passage therethrough and having at one end on an outer face thereof a valve seat, and at the other end an outwardly-projecting flange defining an annular recess between one face and the exterior of the tubular support and having an end portion projecting over the recess and forming a reentrant tip portion, the flange engaging and permanently and fixedly retaining a metallic poppet cage, the poppet cage being formed with a central annular body and a plurality of struts extending therefrom, each strut having an in-line end portion permanently bent upon itself in a 180° turn and having the tip end thereof snugly engaged and retained in the recess by the reentrant tip portion of the flange; a metallic valve poppet movable within the cage towards and away from the valve seat, to open and close the valve passage, the interior of the poppet cage closely abutting the outer periphery of the valve poppet and serving as a track along which the valve poppet slides in its movement toward and away from the valve seat; and a metallic coil spring within the cage retained at one end against the poppet-cage and at the other end against the valve poppet, biasing the poppet toward the valve seat, and retaining the poppet in a closed position at fluid pressures applied against the valve poppet up to a predetermined minimum, the valve poppet at fluid pressures in excess of said minimum overcoming the biasing force of the coil spring and moving away from the valve seat, to open the relief valve passage.

2. A relief valve assembly in accordance with claim 1, in which the tubular support is formed of a solid piece through which extends the relief valve passage and on one face of which is the valve seat.

3. A relief valve assembly in accordance with claim 2, made entirely of stainless steel.

* * * * *